US011860657B2

(12) United States Patent
Takada

(10) Patent No.: US 11,860,657 B2
(45) Date of Patent: Jan. 2, 2024

(54) SEMICONDUCTOR DEVICE AND SEMICONDUCTOR INTEGRATED CIRCUIT

(71) Applicant: KIOXIA CORPORATION, Tokyo (JP)

(72) Inventor: Shuichi Takada, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 31 days.

(21) Appl. No.: 17/686,061

(22) Filed: Mar. 3, 2022

(65) Prior Publication Data

US 2023/0077592 A1 Mar. 16, 2023

(30) Foreign Application Priority Data

Sep. 16, 2021 (JP) ................................. 2021-151492

(51) Int. Cl.
*G05F 1/56* (2006.01)
*G05F 1/575* (2006.01)

(52) U.S. Cl.
CPC .............. *G05F 1/561* (2013.01); *G05F 1/575* (2013.01)

(58) Field of Classification Search
None
See application file for complete search history.

(56) References Cited

U.S. PATENT DOCUMENTS

| | | | | |
|---|---|---|---|---|
| 6,838,784 | B2 * | 1/2005 | Uematsu | H02M 3/157 307/38 |
| 9,494,957 | B2 * | 11/2016 | Price | H01L 22/30 |
| 10,660,176 | B2 * | 5/2020 | Chen | H05B 45/48 |
| 10,802,564 | B2 * | 10/2020 | Yang | H02H 1/0092 |
| 2018/0247678 | A1 * | 8/2018 | Vergis | G11C 5/14 |

FOREIGN PATENT DOCUMENTS

| | | |
|---|---|---|
| JP | 2003-169470 A | 6/2003 |
| JP | 2006-174658 A | 6/2006 |
| JP | 2010-198101 A | 9/2010 |

* cited by examiner

*Primary Examiner* — Thomas J. Hiltunen
(74) *Attorney, Agent, or Firm* — Kim & Stewart LLP

(57) ABSTRACT

A semiconductor device includes a regulator circuit, a wire, n load circuits, and an analog circuit. The wire is connected to the regulator circuit and including n connection nodes (n is an integer of 2 or more). The n load circuits are connected to the n connection nodes, respectively. The analog circuit is connected between the n connection nodes and the regulator circuit. The analog circuit is configured to generate an average voltage of n voltages at the n connection nodes. The regulator circuit is configured to generate an output voltage supplied to the wire based on the average voltage generated by the analog circuit.

20 Claims, 6 Drawing Sheets

SEMICONDUCTOR DEVICE AND SEMICONDUCTOR INTEGRATED CIRCUIT

CROSS-REFERENCE TO RELATED APPLICATION

This application is based upon and claims the benefit of priority from Japanese Patent Application No. 2021-151492, filed Sep. 16, 2021, the entire contents of which are incorporated herein by reference.

FIELD

Embodiments described herein relate generally to a semiconductor device and a semiconductor integrated circuit.

BACKGROUND

A semiconductor device includes a regulator circuit and a load circuit. The regulator circuit generates an output voltage having a voltage value different from a voltage value of a supplied input voltage, based on a reference voltage and supplies the output voltage to the load circuit. It is desirable that the level of the output voltage supplied to the load circuit is stable.

DETAILED DESCRIPTION

Embodiments provide a semiconductor device and a semiconductor integrated circuit capable of stably supplying an output voltage of an appropriate level to a load circuit.

In general, according to an embodiment, a semiconductor device includes a regulator circuit, a wire, n load circuits, and an analog circuit. The wire is connected to the regulator circuit and including n connection nodes (n is an integer of 2 or more). The n load circuits are connected to the n connection nodes, respectively. The analog circuit is connected between the n connection nodes and the regulator circuit. The analog circuit is configured to generate an average voltage of n voltages at the n connection nodes. The regulator circuit is configured to generate an output voltage supplied to the wire based on the average voltage generated by the analog circuit.

A semiconductor device and a semiconductor integrated circuit according to embodiments will be described in detail with reference to the accompanying drawings. The present disclosure is not limited to the following embodiments.

Embodiment

Figure 1:
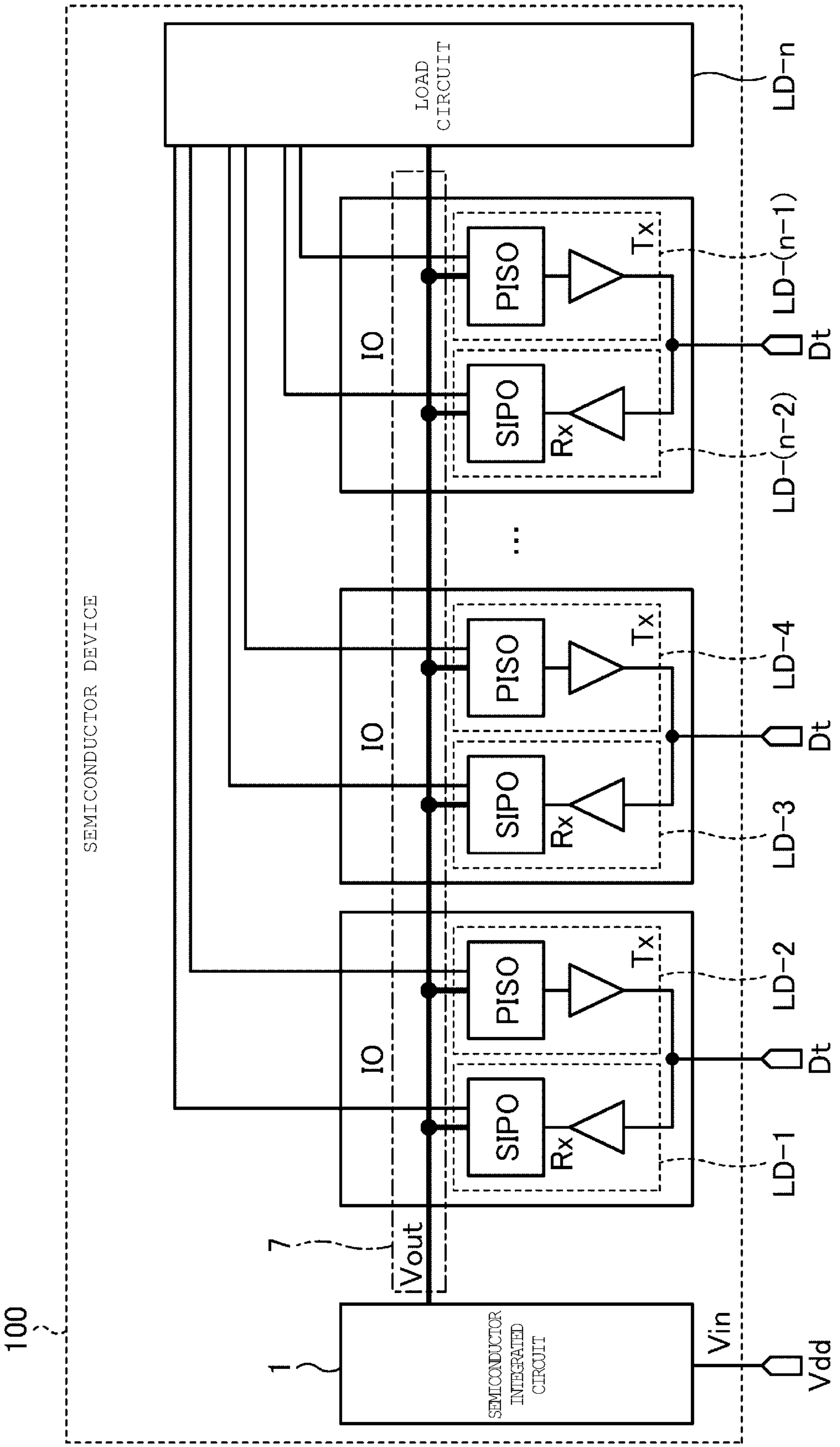
FIG. 1 is a block diagram illustrating a schematic configuration of a semiconductor device according to an embodiment.

A semiconductor device according to an embodiment can be configured as illustrated in FIG. 1. FIG. 1 is a block diagram illustrating a schematic configuration of a semiconductor device 100.

The semiconductor device 100 includes an input power supply terminal Vdd, a plurality of data terminals Dt, a semiconductor integrated circuit 1, a wire 7, and n load circuits LD-1 to LD-n. n is a certain integer of 2 or more. Two or more load circuits LD among the n load circuits LD-1 to LD-(n-1) are provided in one input/output (IO) circuit, and a plurality of IO circuits are provided.

The semiconductor integrated circuit 1 is, for example, a power supply circuit having an input node connected to an input power supply terminal Vdd and an output node connected to the n load circuits LD-1 to LD-n via the wire 7. The load circuits LD-1, LD-3, . . . , LD-(n-2) are input side circuits in the IO circuits, and the load circuits LD-2, LD-4, . . . , LD-(n-1) are output side circuits in the IO circuits. Both the input side circuit and the output side circuit are disposed between the data terminal Dt and the wire 7. LD-n is an internal circuit connected to the respective IO circuits.

The semiconductor integrated circuit 1 is disposed between the input power supply terminal Vdd and the load circuits LD-1 to LD-n. The semiconductor integrated circuit 1 receives an input voltage Vin at the input power supply terminal Vdd from the outside of the semiconductor device 100, and outputs an output voltage Vout that is generated based on the input voltage Vin and a certain reference voltage, from the output node.

The semiconductor integrated circuit 1 is commonly provided for the n load circuits LD-1 to LD-n. Thereby, a chip area of the semiconductor device 100 can be reduced, and a cost of the semiconductor device 100 can be reduced.

When power supply noise is introduced to the input power supply terminal Vdd from the outside, influence of the power supply noise on the load circuits LD-1 to LD-n is reduced by the semiconductor integrated circuit 1. Thereby, the respective load circuits LD-1 to LD-n can operate at a relatively low output voltage Vout, and low power consumption can be achieved.

The output voltage Vout is supplied to the respective load circuits LD-1 to LD-n via the wire 7.

Figure 2:
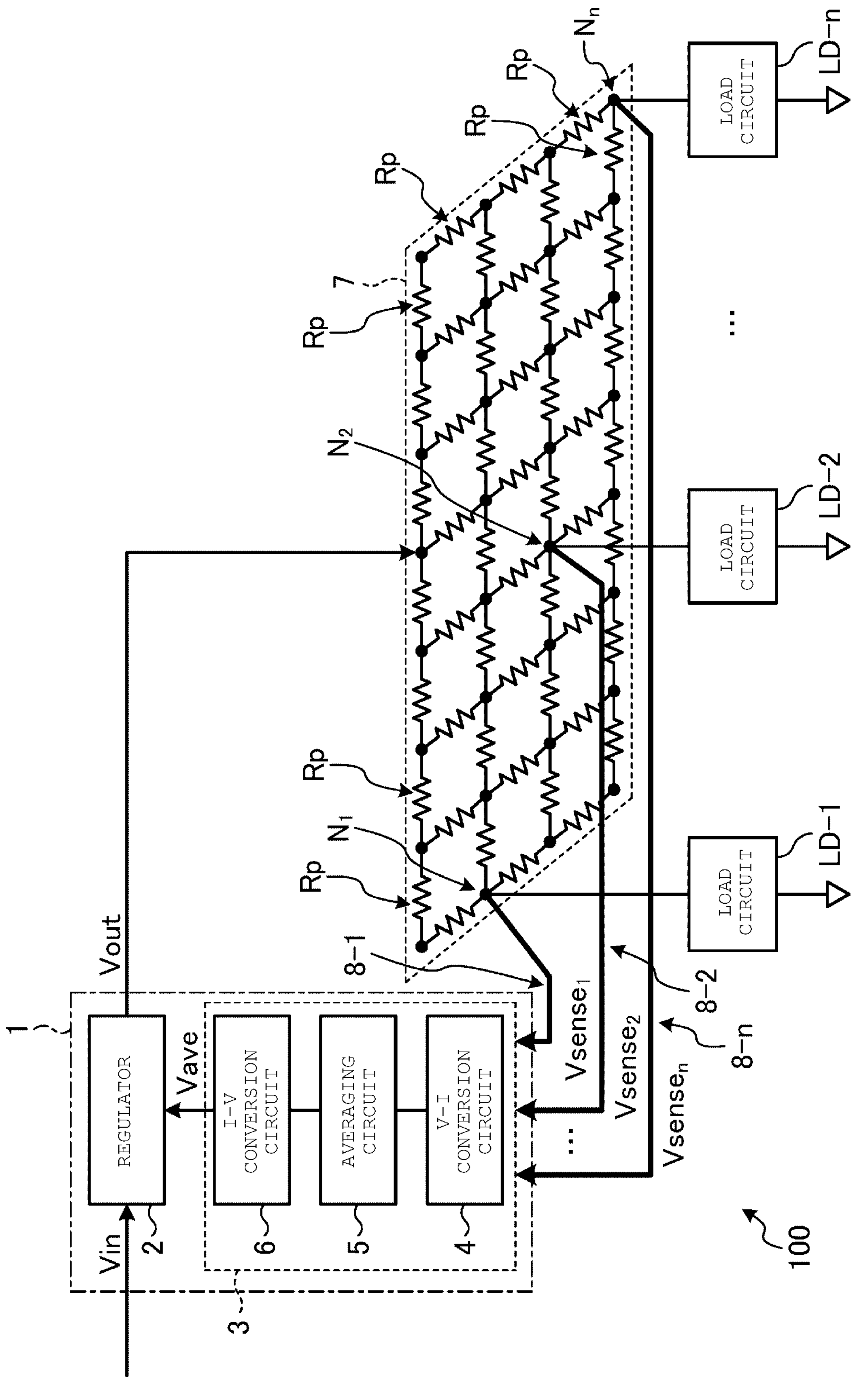
FIG. 2 is a diagram illustrating components of a semiconductor integrated circuit and an equivalent circuit of a wire in the semiconductor device according to the embodiment.

At this time, the wire 7 has a structure that is electrically equivalent to a mesh wiring structure as illustrated in FIG. 2. FIG. 2 illustrates a schematic configuration of the semiconductor integrated circuit 1 and an equivalent circuit of the wire 7 in the semiconductor device 100. A plurality of parasitic resistances Rp, which are connected in a mesh configuration in the equivalent circuit, are connected between the output node of the semiconductor integrated circuit 1 and the load circuits LD-1 to LD-n. Since some of the parasitic resistances Rp are connected in parallel to each other, wiring resistance from the semiconductor integrated circuit 1 to the respective load circuits LD-1 to LD-n can be reduced. The wire 7 may be two-dimensionally connected in a mesh configuration in one wiring layer provided on a substrate. Thereby, a cost can be reduced compared to when a plurality of wiring layers are used.

The n load circuits LD-1 to LD-n are connected to n connection nodes N ($N_1$ to $N_n$) in the wire 7, respectively. In the wire 7, the number of parasitic resistances Rp passing therethrough and a connection configuration are different depending on the paths from the output node of the semiconductor integrated circuit 1 to the respective nodes $N_1$ to $N_n$. For that reason, voltage drop amounts of the respective paths are also different from each other. Further, in the n load circuits LD-1 to LD-n, equivalent load resistance viewed from the semiconductor integrated circuit 1 side may change dynamically. For that reason, the voltage drop amounts of the n connection nodes $N_1$ to $N_n$ for the output node of the semiconductor integrated circuit 1 may change dynamically.

To address such an issue, the semiconductor integrated circuit 1 according to the present embodiment outputs the output voltage Vout of which voltage value is adjusted with respect to the output node based on an analog voltage obtained by averaging n voltages at the n connection nodes $N_1$ to $N_n$.

Specifically, the semiconductor device 100 further includes n feedback lines 8 (8-1 to 8-n). The n feedback lines 8-1 to 8-n correspond to the n connection nodes $N_1$ to $N_n$, respectively. The feedback lines 8 each connect a corresponding connection node N to the semiconductor integrated circuit 1.

The semiconductor integrated circuit 1 includes a regulator circuit 2 and an analog circuit 3. The regulator circuit 2 is preferably configured with a low drop out (LDO) type. Thereby, the output voltage Vout is generated without switching, and thus, the semiconductor integrated circuit 1 can reduce noise compared to when the circuit is configured with a DC-DC converter type, which is of a switching type. Further, since the circuit can be configured without using inductance, the size of the semiconductor integrated circuit 1 can be reduced compared to when the circuit is configured with the DC-DC converter type.

The analog circuit 3 is connected between the n connection nodes $N_1$ to $N_n$ and the regulator circuit 2. The analog circuit 3 generates an analog voltage Vave by averaging, in an analog manner, n voltages $Vsense_1$ to $Vsense_n$ at the n connection nodes $N_1$ to $N_n$. The analog circuit 3 supplies the generated analog voltage Vave to the regulator circuit 2. The regulator circuit 2 outputs the output voltage Vout of which voltage value is adjusted based on the analog voltage Vave.

Figure 3:
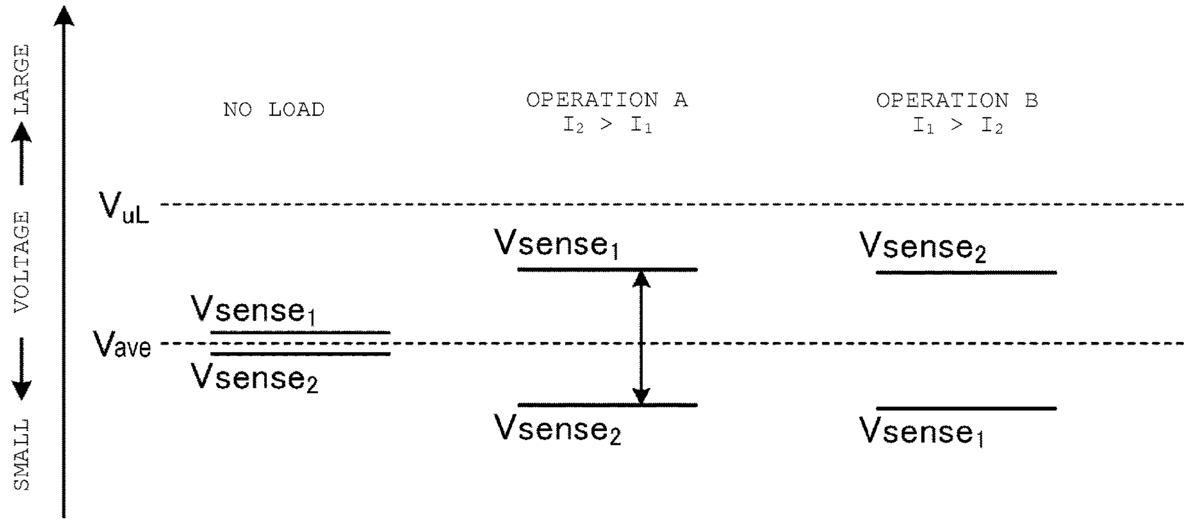
FIG. 3 is a diagram to illustrate an operation of an analog circuit according to the embodiment.

For example, when n=2, the analog circuit 3 generates the analog voltage Vave, as illustrated in FIG. 3. FIG. 3 is a diagram to illustrate an operation of the analog circuit 3.

In a state of "no load" in which the load circuits LD-1 and LD-2 are stopped, operating currents of the load circuits LD-1 and LD-2 are almost the same. Accordingly, levels of the voltages $Vsense_1$ and $Vsense_2$ at two connection nodes $N_1$ and $N_2$ are close to each other. The analog circuit 3 generates the analog voltage Vave by averaging the voltages $Vsense_1$ and $Vsense_2$. The level of the analog voltage Vave is close to respective levels of the two voltages $Vsense_1$ and $Vsense_2$. The analog voltage Vave is within an upper limit voltage $V_{uL}$ or lower.

It is assumed that an operating current of the load circuit LD-1 is $I_1$ and an operating current of the load circuit LD-2 is $I_2$. In a state of "operation A" in which the load circuits LD-1 and LD-2 are $I_2>I_1$, a relationship of levels of the voltages $Vsense_1$ and $Vsense_2$ at two connection nodes $N_1$ and $N_2$ are $Vsense_1>Vsense_2$. The analog circuit 3 generates the analog voltage Vave by averaging the voltages $Vsense_1$ and $Vsense_2$. A relationship between the respective voltages is $Vsense_1>Vave>Vsense_2$. The analog voltage Vave is an intermediate value between the two voltages $Vsense_1$ and $Vsense_2$. The analog voltage Vave is within the upper limit voltage $V_{uL}$ or lower.

In a state of "operation B" in which the respective load circuits LD-1 and LD-2 are $I_1>I_2$, a relationship of levels of the voltages $Vsense_1$ and $Vsense_2$ at the two connection nodes $N_1$ and $N_2$ are $Vsense_1<Vsense_2$. The analog circuit 3 generates the analog voltage Vave by averaging the voltages $Vsense_1$ and $Vsense_2$. A relationship between the respective voltages is $Vsense_1<Vave<Vsense_2$. Even in this state, the analog voltage Vave becomes an intermediate value between the two voltages $Vsense_1$ and $Vsense_2$ and is within the upper limit voltage $V_{uL}$ or lower.

Comparing the state of "no load", the state of "operation A", and the state of "operation B", levels of the analog voltages Vave are almost the same. Thereby, in the semiconductor integrated circuit 1, the analog circuit 3 can generate the analog voltage Vave that is less likely to be influenced by a dynamic change in the voltage drop amount. The regulator circuit 2 can output the output voltage Vout obtained by adjusting a voltage value generated based on the input voltage Vin and a certain reference voltage, using the analog voltage Vave. Accordingly, even when the voltage drop amounts of the n connection nodes $N_1$ to $N_n$ change dynamically, the output voltage Vout of an appropriate level can be stably supplied to the n load circuits LD-1 to LD-n. That is, the output voltage Vout has a small difference in the voltage drop amount for each of the load circuits LD and thus is less likely to be influenced by a dynamic change in the voltage drop amount.

As illustrated in FIG. 2, the analog circuit 3 includes a voltage-current (V-I) conversion circuit 4, an averaging circuit 5, and an current-voltage (I-V) conversion circuit 6. The V-I conversion circuit 4 is connected to the n connection nodes $N_1$ to $N_n$ via the respective n feedback lines 8-1 to 8-n. The V-I conversion circuit 4 converts the n voltages $Vsense_1$ to $Vsense_n$ received from the n connection nodes $N_1$ to $N_n$ via the respective n feedback lines 8-1 to 8-n into n currents $Isense_1$ to $Isense_n$, respectively. The V-I conversion circuit 4 supplies the n currents $Isense_1$ to $Isense_n$ to the averaging circuit 5. The averaging circuit 5 averages the n currents $Isense_1$ to $Isense_n$ to generate an averaged current lave. The averaging circuit 5 supplies the current lave to the I-V conversion circuit 6. The I-V conversion circuit 6 converts the current lave into the analog voltage Vave. The I-V conversion circuit 6 supplies the analog voltage Vave to the regulator circuit 2.

Figure 4:
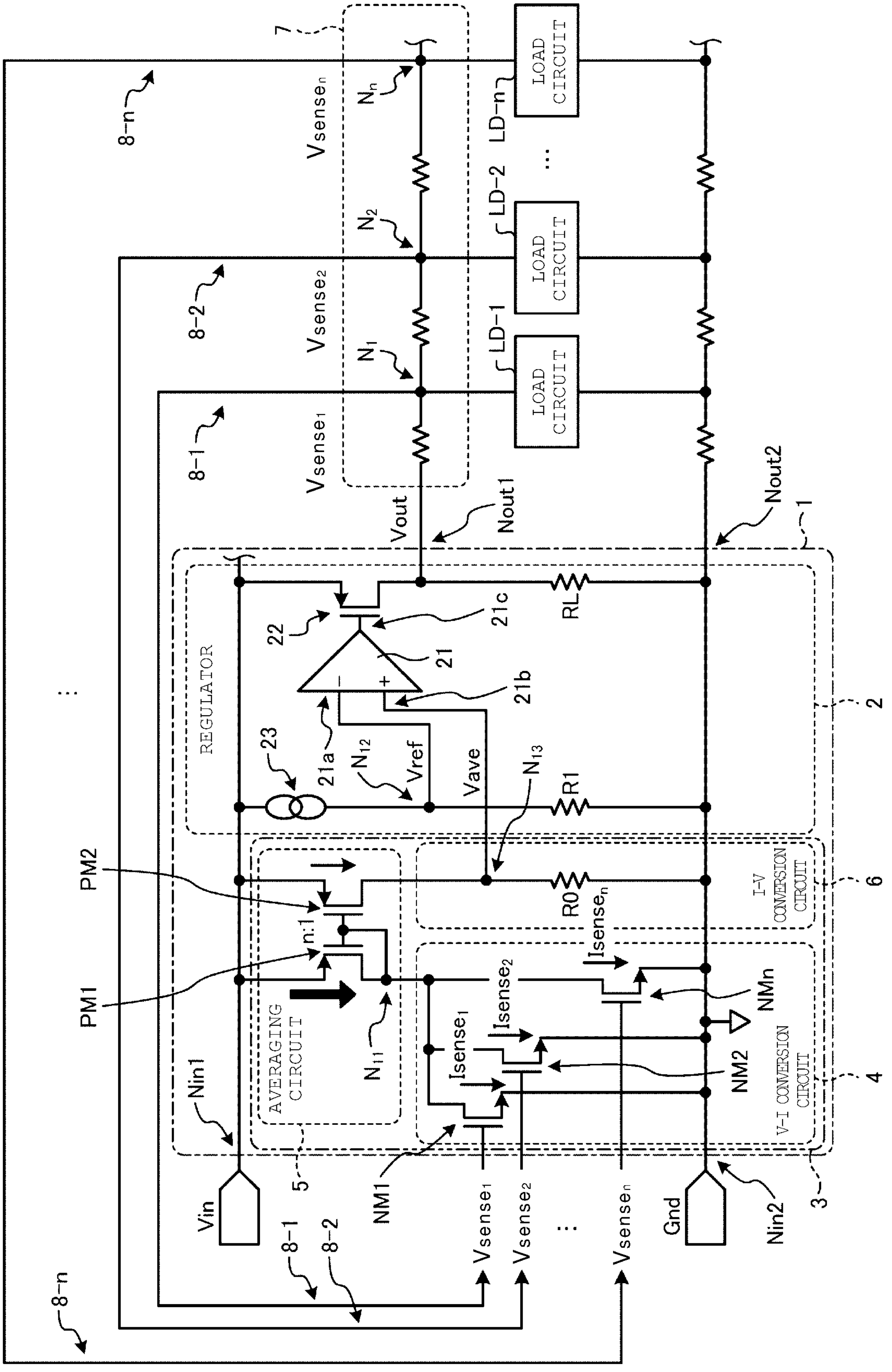
FIG. 4 is a circuit diagram illustrating a detailed configuration of the semiconductor device according to the embodiment.

Next, a detailed circuit configuration of the semiconductor integrated circuit 1 will be described with reference to FIG. 4. FIG. 4 is a circuit diagram illustrating the detailed configuration of the semiconductor integrated circuit 1.

The semiconductor integrated circuit 1 includes input nodes Nin1 and Nin2 and output nodes Nout1 and Nout2. The semiconductor integrated circuit 1 receives the input voltage Vin at the input node Nin1 and receives a ground voltage Gnd at the input node Nin2. The semiconductor integrated circuit 1 outputs the output voltage Vout from the output node Nout1 to the plurality of load circuits LD-1 to LD-n via the wire 7. The semiconductor integrated circuit 1 outputs the ground voltage Gnd from the output node Nout2 to the plurality of load circuits LD-1 to LD-n. A wire from the input node Nin2 to the output node Nout2 is a ground node at the ground voltage Gnd.

The regulator circuit 2 includes an operational amplifier 21, an output transistor 22, a current source 23, a resistance element R1, and a resistance element RL.

The operational amplifier 21 includes an input node 21*a*, an input node 21*b*, and an output node 21*c*. The input node 21*a* is an inverting input node (−) and connected to the node $N_{12}$. A reference voltage Vref is supplied to the input node 21*a*. The input node 21*b* is a non-inverting input node (+) and connected to a node $N_{13}$. The analog voltage Vave at the node $N_{13}$ is supplied to the input node 21*b*. The output node 21*c* is connected to the output transistor 22.

The output transistor 22 is disposed between the operational amplifier 21 and the wire 7. The output transistor 22 is configured with, for example, a PMOS transistor. The output transistor 22 has a source connected to the input node Nin1, a gate connected to the output node 21*c* of the operational amplifier 21, and a drain connected to the wire 7 via the output node Nout1.

The current source 23 has a first terminal connected to the input node Nin1 and a second terminal connected to the node $N_{12}$. The resistance element R1 has a first terminal connected to the node $N_{12}$ and a second terminal connected to the ground node. The current source 23 causes, for example, a substantially constant current to flow. Thereby, a voltage drop occurs in the resistance element R1, and a voltage of the node $N_{12}$ becomes the reference voltage Vref.

The resistance element RL has a first terminal connected to the output node Nout1 and a second terminal connected to the output node Nout2 via the ground node. When a current flows through the resistance element RL in a state in which the output transistor 22 is kept on, the output voltage Vout based on the ground voltage Gnd at the output node Nout2 is generated at the output node Nout1.

In the analog circuit 3, the V-I conversion circuit 4 includes n transistors NM1 to NMn. The n transistors NM1 to NMn correspond to the n connection nodes $N_1$ to $N_n$, respectively. The n transistors NM1 to NMn are connected in parallel to each other between the node $N_{11}$ and the ground voltage Gnd. The transistors NM1 to NMn each have a gate connected to a corresponding connection node, a drain commonly connected to the node $N_{11}$, and a source connected to the ground node. The n transistors NM1 to NMn may have uniform dimensions (=W/L, W: channel width, L: channel length).

The transistor NM1 is, for example, an NMOS transistor. The transistor NM1 has a gate connected to the connection node $N_1$ via the feedback line 8-1, a drain connected to the node $N_{11}$, and a source connected to the ground node. The transistor NM1 receives a voltage of the connection node $N_1$ via the feedback line 8-1 at the gate thereof and causes the current $Isense_1$ corresponding to the voltage of the connection node $N_1$ to flow from the node $N_{11}$ to the ground node through the drain and the source. That is, the transistor NM1 converts the voltage of the connection node $N_1$ into the corresponding current $Isense_1$.

The transistor NM2 is, for example, an NMOS transistor. The transistor NM2 has a gate connected to the connection node $N_2$ via the feedback line 8-2, a drain connected to the node $N_{11}$, and a source connected to the ground node. The transistor NM2 receives a voltage of the connection node $N_2$ via the feedback line 8-2 at the gate thereof and causes the current $Isense_2$ corresponding to the voltage of the connection node $N_2$ to flow from the node $N_{11}$ to the ground node through the drain and the source. That is, the transistor NM2 converts the voltage of the connection node $N_2$ into the corresponding current $Isense_2$.

The transistor NMn is, for example, an NMOS transistor. The transistor NMn has a gate connected to the connection node $N_n$ via the feedback line **8-*n*, a drain connected to the node $N_{11}$, and a source connected to the ground node. The transistor NMn receives a voltage of the connection node $N_n$ via the feedback line 8-*n*** at the gate thereof and causes the current $Isense_n$ corresponding to the voltage of the connection node $N_n$ to flow from the node $N_{11}$ to the ground node through the drain and the source. That is, the transistor NMn converts the voltage of the connection node $N_n$ into the corresponding current $Isense_n$.

The averaging circuit 5 includes a current mirror circuit. The averaging circuit 5 includes a plurality of (here, 2) transistors PM1 and PM2 provided in the current mirror circuit.

The transistor PM1 is, for example, a PMOS transistor. The transistor PM1 has a drain connected to the node $N_{11}$, a gate connected to the node $N_{11}$, and a source connected to the input node Nin1.

The transistor PM2 is, for example, a PMOS transistor. The transistor PM2 has a gate connected to the node $N_{11}$ and the gate of the transistor PM1, a drain connected to the node $N_{13}$, and a source connected to the input node Nin1.

The transistors PM1 and PM2 configure a current mirror circuit having a mirror ratio of 1/n. A dimension of the transistor PM1 is n times the dimension of the transistor PM2. Thereby, a mirror ratio of the transistor PM1 to the transistor PM2 can be set to n:1. A drain current that is 1/n times the drain current of the transistor PM1 flows to the transistor PM2 side.

That is, the averaging circuit 5 sums the n currents $Isense_1$ to $Isense_n$ at the node $N_{11}$, and the current mirror circuit multiplies the total current by 1/n. Thereby, the averaging circuit 5 averages the n currents $Isense_1$ to $Isense_n$ in a state of analog quantity (that is, in an analog manner) and causes an averaged current Iave to flow to the node $N_{13}$.

The I-V conversion circuit 6 includes a resistance element R0. The resistance element R0 has a first terminal connected to the node $N_{13}$ and a second terminal connected to the ground node. The node $N_{13}$ becomes the analog voltage Vave when the current Iave flows through the resistance element R0. That is, the resistance element R0 is used to convert the current Iave into the analog voltage Vave.

The operational amplifier 21 of the regulator circuit 2 supplies a voltage corresponding to a difference between the analog voltage Vave and the reference voltage Vref to the gate of the output transistor 22. Thereby, the output transistor 22 causes a drain current corresponding to the difference between the analog voltage Vave and the reference voltage Vref to flow through the resistance element RL. As a result, the output voltage Vout adjusted according to the analog voltage Vave appears at the output node Nout1. That is, the regulator circuit 2 outputs the output voltage Vout from the output node Nout1 by adjusting the input voltage Vin based on the reference voltage Vref and the analog voltage Vave.

As described above, in the semiconductor device 100 according to the embodiment, the analog circuit 3 of the semiconductor integrated circuit 1 generates the analog voltage Vave by averaging the n voltages received from the n connection nodes. Thereby, the analog voltage Vave that is less likely to be influenced by a dynamic change in a voltage drop amount can be generated. The regulator circuit 2 outputs the output voltage Vout, which is obtained by adjusting the input voltage Vin based on the reference voltage Vref and the analog voltage Vave, to each of the load circuits LD via the wire 7 from an output node thereof. Thereby, even when voltage drop amounts of the n connection nodes $N_1$ to $N_n$ change dynamically, the output voltage Vout of an appropriate level can stably be supplied to the n load circuits LD-1 to LD-n. That is, the output voltage Vout has a small difference in the voltage drop amount and is less likely to be influenced by a dynamic change in the voltage drop amount. Thus, a wide margin can be obtained in timing design of an operation of each of the load circuits LD.

In a comparative example, voltages of the n connection nodes $N_1$ to $N_n$ are AD-converted, n voltages are averaged in a state of digital quantity, and the averaged voltage is DA-converted to obtain an average voltage of analog quantity. In this case, overhead in the processing time between an AD conversion process and a DA conversion process can significantly increase, and the time from acquisition of the voltages of the n connection nodes $N_1$ to $N_n$ to acquisition of the average voltage of analog quantity can significantly increase.

In contrast, according to the embodiment, the analog circuit 3 averages the n voltages in the state of analog quantity to generate an analog voltage. Thereby, the time from acquisition of the voltages of the n connection nodes $N_1$ to $N_n$ to acquisition of the average voltage of analog quantity can be easily reduced. Thereby, even when voltage drop amounts of the n connection nodes $N_1$ to $N_n$ change dynamically, the semiconductor integrated circuit 1 can adapt to the change in almost real time. That is, the output voltage Vout of an appropriate level, which is less likely to be influenced by a dynamic change in a voltage drop amount, can be supplied to the n load circuits LD-1 to LD-n in real time.

Figure 5:
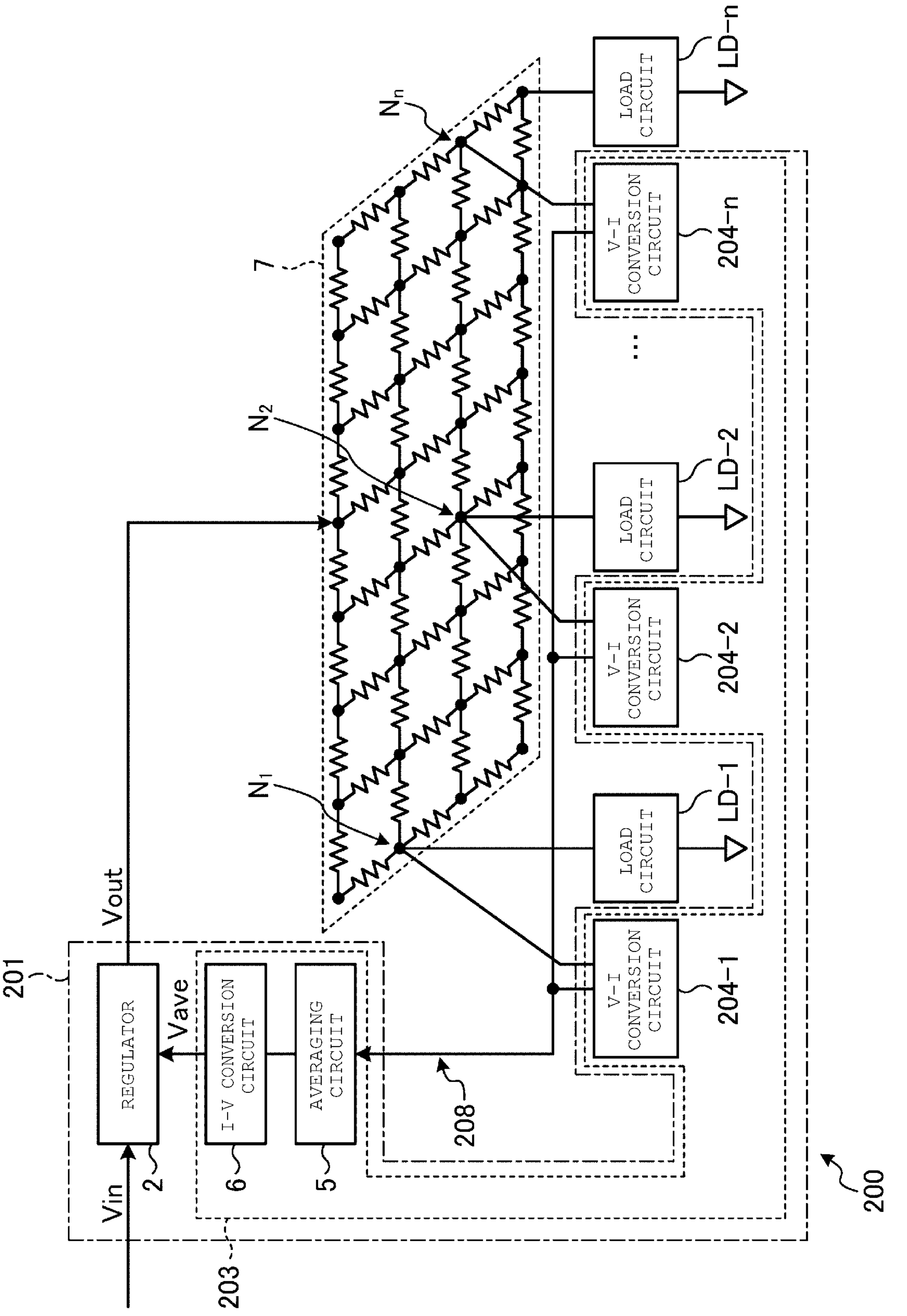
FIG. 5 is a diagram illustrating components of a semiconductor integrated circuit and an equivalent circuit of a wire in a semiconductor device according to a modification example of the embodiment.

In the configuration illustrated in FIG. 2, the n feedback lines 8-1 to **8-*n* are connected to the semiconductor integrated circuit 1 from the n connection nodes $N_1$ to $N_n$ in the semiconductor device 100. However, as in the semiconductor device 200 illustrated in FIG. 5, some measures may be taken to reduce the number of feedback lines to the semiconductor integrated circuit 1. FIG. 5 is a circuit diagram illustrating a schematic configuration of a semiconductor device 200** according to a modification example of the embodiment.

The semiconductor device 200 includes a semiconductor integrated circuit 201 and one feedback line 208 instead of the semiconductor integrated circuit 1 and the n feedback lines 8-1 to **8-*n* (see FIG. 2). The semiconductor integrated circuit 201 includes an analog circuit 203 instead of the analog circuit 3 (see FIG. 2). The analog circuit 203 includes n V-I conversion circuits 204-1 to 204-*n* instead of the V-I conversion circuit 4 (see FIG. 2**).

The n V-I conversion circuits 204-1 to **204-*n* respectively correspond to the n load circuits LD-1 to LD-n and the n connection nodes $N_1$ to $N_n$, and the V-I conversion circuits 4 can be divided into n pieces. Each of the V-I conversion circuits 204-1 to 204-*n*** is connected to the corresponding connection node N in parallel with the corresponding load circuit LD.

Figure 6:
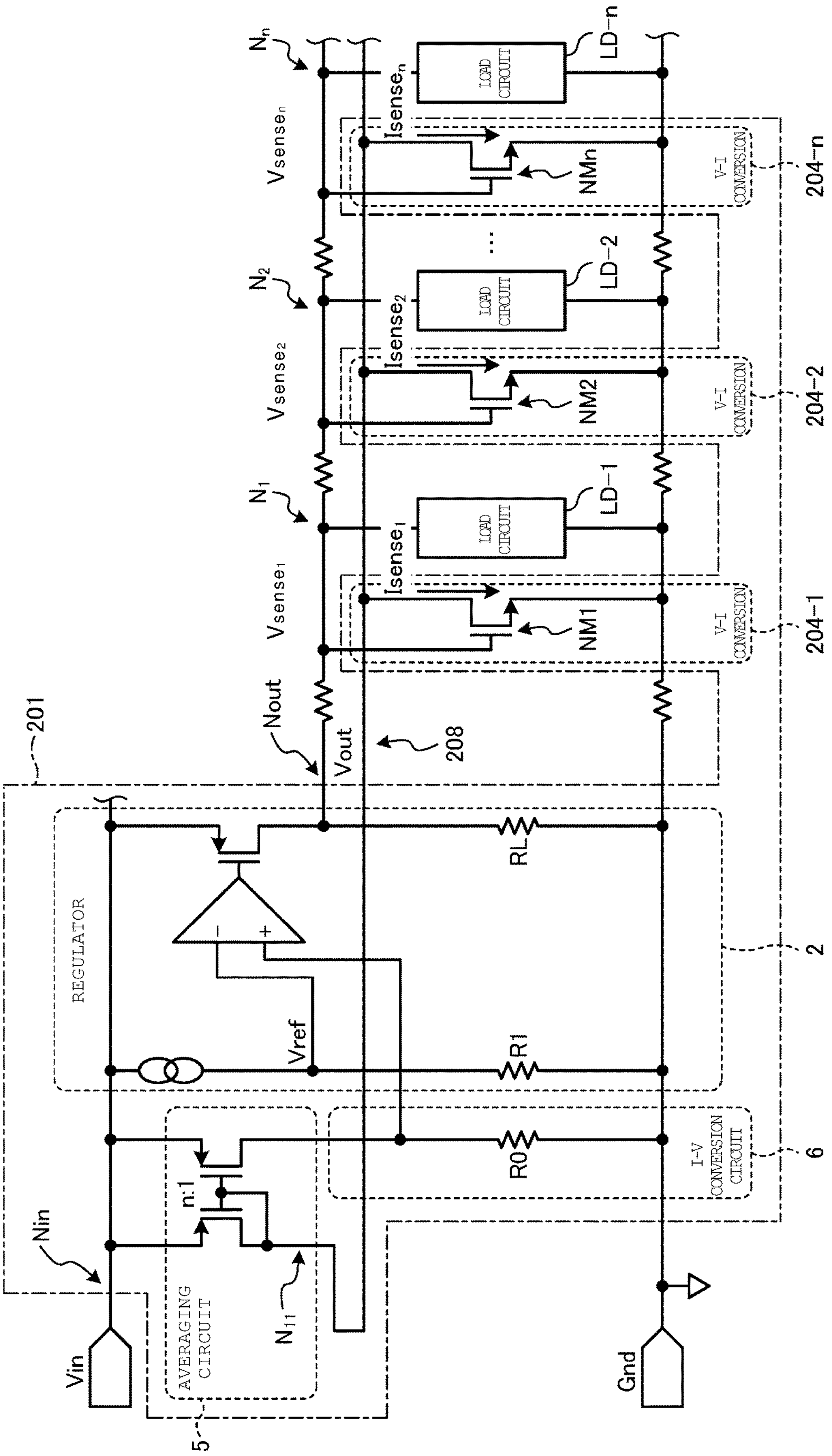
FIG. 6 is a circuit diagram illustrating a detailed configuration of the semiconductor device according to the modification example of the embodiment.

The n V-I conversion circuits 204-1 to **204-*n* include n transistors NM1 to NMn corresponding to those illustrated in FIG. 4. Specifically, the n V-I conversion circuits 204-1 to 204-*n* are configured as illustrated in FIG. 6. FIG. 6 is a circuit diagram illustrating a detailed configuration of the semiconductor device 200 according to the modification example of the embodiment. The V-I conversion circuits 204-1 to 204-*n* each have a corresponding transistor NM (NM1 to NMn). The transistors NM1 to NMn each have a gate connected to a corresponding connection node N, a drain commonly connected to a node $N_{11}$ via a feedback line 208**, and a source connected to a ground node.

The V-I conversion circuit 204-1 includes the transistor NM1. The transistor NM1 has a gate connected to a connection node $N_1$, a drain connected to the node $N_{11}$ via the feedback line 208, and a source connected to the ground node.

The V-I conversion circuit 204-2 includes the transistor NM2. The transistor NM2 has a gate connected to a connection node $N_2$, a drain connected to the node $N_{11}$ via the feedback line 208, and a source connected to the ground node.

The V-I conversion circuit **204-*n* includes the transistor NMn. The transistor NMn has a gate connected to a connection node $N_n$, a drain connected to the node $N_{11}$ via the feedback line 208**, and a source connected to the ground node.

As illustrated in FIGS. 5 and 6, the feedback line 208 is connected to the n V-I conversion circuits 204-1 to **204-*n* and an averaging circuit 5. As illustrated in FIG. 5, the feedback line 208 has a first terminal connected to the averaging circuit 5 and n second terminals connected to the respective n V-I conversion circuits 204-1 to 204-*n*. Specifically, as illustrated in FIG. 6, the feedback line 208 has the first terminal connected to the node $N_{11}$ and the n second terminals respectively connected to drains of the n transistors NM1** to NMn.

The transistor NM1 receives a voltage of the connection node $N_1$ at the gate thereof and causes a current $Isense_1$ corresponding to the voltage of the connection node $N_1$ to flow from the node $N_{11}$ to the ground node through the drain and source thereof via the feedback line 208.

The transistor NM2 receives a voltage of the connection node $N_2$ at the gate thereof and causes a current $Isense_2$ corresponding to the voltage of the connection node $N_2$ to flow from the node $N_{11}$ to the ground node through the drain and source thereof via the feedback line 208.

The transistor NMn receives a voltage of the connection node $N_n$ at the gate thereof and causes a current $Isense_n$ corresponding to the voltage of the connection node $N_n$ to flow from the node $N_{11}$ to the ground node through the drain and source thereof via the feedback line 208.

The n currents $Isense_1$ to $Isense_n$ flow through the n V-I conversion circuits 204-1 to **204-*n***, respectively, and a sum of the n currents flows through the node $N_{11}$. That is, the n currents $Isense_1$ to $Isense_n$ are summed at the node $N_{11}$.

As described above, the semiconductor device 200 according to the modification example of the embodiment can reduce the number of feedback lines 208 connecting between the n connection nodes $N_1$ to $N_n$ and the regulator circuit 2 to one line and can reduce an occupied area of the feedback line 208.

The n V-I conversion circuits 204-1 to **204-*n*** that are divided and arranged to correspond to the n connection nodes $N_1$ to $N_n$, respectively, may be mounted in the individual load circuits LD and may be arranged in the vicinity of the load circuits LD.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor device comprising:

a regulator circuit;

a wire connected to the regulator circuit and including n connection nodes (n is an integer of 2 or more);

n load circuits connected to the n connection nodes, respectively; and an analog circuit connected between the n connection nodes and the regulator circuit, the analog circuit configured to generate an average voltage of n voltages at the n connection nodes, wherein the regulator circuit is configured to generate an output voltage supplied to the wire based on the average voltage generated by the analog circuit, and wherein the analog circuit includes:

an analog voltage-current conversion circuit configured to convert the n voltages at the n connection nodes into n currents, respectively;

an analog averaging circuit configured to generate an average current of the n currents; and an analog current-voltage conversion circuit configured to convert the average current into the average voltage.

2. The semiconductor device according to claim 1, wherein the analog averaging circuit includes a current mirror circuit having a mirror ratio of 1/n.

3. The semiconductor device according to claim 1, wherein the analog voltage-current conversion circuit includes:

n first transistors having n gates connected to the n connection nodes, respectively, n drains commonly connected to a first node, and n sources commonly connected to a reference node at a reference voltage.

4. The semiconductor device according to claim 3, wherein the analog averaging circuit includes:

a second transistor having a drain and a gate that are connected to the first node; and a third transistor having a drain connected to a terminal of the regulator circuit and a gate connected to the first node.

5. The semiconductor device according to claim 3, further comprising:

n feedback lines connected between the n connection nodes and the n gates of the n first transistors, respectively.

6. The semiconductor device according to claim 1, wherein the regulator circuit includes:

an operational amplifier having a first input node at a reference voltage, a second input node at the averaged voltage, and an output node; and a transistor having a source connected to an input node of the regulator circuit, a gate connected to the output node of the operational amplifier, and a drain connected to the wire.

7. The semiconductor device according to claim 1, wherein the wire is formed with a wiring layer disposed on a substrate.

8. The semiconductor device according to claim 1, wherein the n load circuits includes a plurality of input/output (IO) circuits and a circuit connected to the IO circuits.

9. The semiconductor device according to claim 1, wherein no analog-to-digital conversion is carried out to generate the average voltage.

10. A semiconductor device comprising:

a regulator circuit;

a wire connected to the regulator circuit and including n connection nodes (n is an integer of 2 or more);

n load circuits connected to the n connection nodes, respectively; and an analog circuit connected between the n connection nodes and the regulator circuit, the analog circuit configured to generate an average voltage of n voltages at the n connection nodes, wherein the regulator circuit is configured to generate an output voltage supplied to the wire based on the average voltage generated by the analog circuit, and wherein the analog circuit includes:

n analog voltage-current conversion circuits, each of which is connected in parallel to one of the n load circuits and configured to convert one of the n voltages at the n connection nodes into a current;

an analog averaging circuit configured to generate an average current of converted currents of the n analog voltage-current conversion circuits; and an analog current-voltage conversion circuit configured to convert the average current into the average voltage.

11. The semiconductor device according to claim 10, wherein the analog averaging circuit includes a current mirror circuit having a mirror ratio of 1/n.

12. The semiconductor device according to claim 10, wherein each of the n analog voltage-current conversion circuits includes:

a first transistor having a gate connected to a corresponding one of the n connection nodes, a drain connected to a first node, and a source connected to a ground line.

13. The semiconductor device according to claim 12, wherein the analog averaging circuit includes:

a second transistor having a drain and a gate that are connected to the first node; and a third transistor having a drain connected to a terminal of the regulator circuit and a gate connected to the first node.

14. The semiconductor device according to claim 12, further comprising:

a feedback line connected between the first node and the gate of the first transistor of each of the n analog voltage-current conversion circuits.

15. A semiconductor integrated circuit comprising:

a regulator circuit configured to connect to a semiconductor device; and an analog circuit connected between n nodes in the semiconductor device and the regulator circuit, where n is an integer of 2 or more, the analog circuit configured to generate an average voltage of n voltages at the n nodes, wherein the regulator circuit is configured to generate an output voltage supplied to the semiconductor device based on the average voltage generated by the analog circuit, and wherein the analog circuit includes:

an analog voltage-current conversion circuit configured to convert the n voltages at the n nodes into n currents, respectively;

an analog averaging circuit configured to generate an average current of the n currents; and an analog current-voltage conversion circuit configured to convert the average current into the average voltage.

16. The semiconductor integrated circuit according to claim 15, wherein the analog averaging circuit includes a current mirror circuit having a mirror ratio of 1/n.

17. The semiconductor integrated circuit according to claim 15, wherein the analog voltage-current conversion circuit includes:

n first transistors having n gates connected to the n nodes, respectively, n drains commonly connected to a first node, and n sources commonly connected to a reference node at a reference voltage.

18. A semiconductor integrated circuit comprising:

a regulator circuit configured to connect to a semiconductor device; and an analog circuit connected between n nodes in the semiconductor device and the regulator circuit, where n is an integer of 2 or more, the analog circuit configured to generate an average voltage of n voltages at the n nodes, wherein the regulator circuit is configured to generate an output voltage supplied to the semiconductor device based on the average voltage generated by the analog circuit, and wherein the analog circuit includes:

n analog voltage-current conversion circuits, each of which is connected in parallel to one of the n load circuits and configured to convert one of the n voltages at the n nodes into a current;

an analog averaging circuit configured to generate an average current of converted currents of the n analog voltage-current conversion circuits; and an analog current-voltage conversion circuit configured to convert the average current into the average voltage.

19. The semiconductor device according to claim 18, wherein the analog averaging circuit includes a current mirror circuit having a mirror ratio of 1/n.

20. The semiconductor device according to claim 18, wherein each of the n analog voltage-current conversion circuits includes:

a first transistor having a gate connected to a corresponding one of the n connection nodes, a drain connected to a first node, and a source connected to a ground line.

* * * * *